(12) United States Patent
Miazgowicz et al.

(10) Patent No.: US 9,784,169 B2
(45) Date of Patent: Oct. 10, 2017

(54) TWO-PORT INTEGRATED EXHAUST MANIFOLD FOR AN INTERNAL COMBUSTION ENGINE HAVING THREE CYLINDERS

(71) Applicant: Ford Global Technologies, LLC, Dearborn, MI (US)

(72) Inventors: Keith D. Miazgowicz, Dearborn, MI (US); Michael Bruno Magnan, Dearborn, MI (US); Ahsanul Karim, Canton, MI (US); Philip Damian Cierpial, Grosse Pointe Park, MI (US); Jeffrey D. Fluharty, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 15/069,113

(22) Filed: Mar. 14, 2016

(65) Prior Publication Data

US 2017/0260892 A1    Sep. 14, 2017

(51) Int. Cl.

| | |
|---|---|
| *F01N 13/10* | (2010.01) |
| *F02B 75/18* | (2006.01) |
| *F01N 3/04* | (2006.01) |
| *F02B 75/20* | (2006.01) |
| *F02F 1/42* | (2006.01) |
| *F02F 1/40* | (2006.01) |
| *F02F 1/24* | (2006.01) |

(52) U.S. Cl.
CPC ............ *F01N 13/102* (2013.01); *F01N 3/046* (2013.01); *F01N 13/107* (2013.01); *F02B 75/20* (2013.01); *F02B 2075/1812* (2013.01); *F02B 2075/1824* (2013.01); *F02B 2075/1848* (2013.01); *F02F 1/243* (2013.01); *F02F 1/40* (2013.01); *F02F 1/4214* (2013.01); *F02F 2001/4278* (2013.01)

(58) Field of Classification Search
CPC ........ F01N 3/046; F01N 13/001; F01N 13/10; F01N 13/107; F01N 13/1805; F02B 2075/1812; F02B 2075/1824; F02B 2075/1848; F02B 75/20; F02B 75/221; F02F 1/243; F02F 1/40; F02F 1/4214; F02F 1/4264; F02F 2001/4278
USPC .................................................... 60/321, 323
See application file for complete search history.

(56) References Cited

U.S. PATENT DOCUMENTS

| | | |
|---|---|---|
| 6,321,532 B1 | 11/2001 | Komush |
| 8,479,511 B2 | 7/2013 | Pursifull et al. |

(Continued)

FOREIGN PATENT DOCUMENTS

WO        2013045018 A2    4/2013

*Primary Examiner* — Jorge Leon, Jr.
(74) *Attorney, Agent, or Firm* — Greg Brown; McCoy Russell LLP

(57) ABSTRACT

Methods and systems are provided for a 2-port integrated exhaust manifold for an inline-3, inline-6, V-6, and/or V-12 engine. In one example, a system may include an exhaust manifold integrated within a cylinder head of an engine block. The integrated exhaust manifold may include a first set of two runners from a first outer cylinder coupled to a first manifold exhaust port, a second set of two runners of a second outer cylinder coupled to a second manifold exhaust port, and one runner of an inner cylinder coupled to the first manifold exhaust port and another runner of the inner cylinder coupled to the second manifold exhaust port.

20 Claims, 8 Drawing Sheets

(56) References Cited

U.S. PATENT DOCUMENTS

| | | |
|---|---|---|
| 8,511,084 B2 | 8/2013 | Ulrey et al. |
| 8,701,409 B2 | 4/2014 | Pursifull et al. |
| 8,713,937 B2 | 5/2014 | Pursifull et al. |
| 8,955,473 B2 | 2/2015 | Zhang |
| 9,157,363 B2 | 10/2015 | Wade et al. |
| 2013/0186061 A1* | 7/2013 | Jarzombek ............... F01N 5/02 60/273 |
| 2013/0199466 A1 | 8/2013 | Friedfeldt et al. |
| 2014/0283799 A1 | 9/2014 | Ulrey et al. |
| 2015/0007563 A1* | 1/2015 | Wade ........................ F02C 6/12 60/605.2 |
| 2015/0007800 A1 | 1/2015 | Wade et al. |
| 2015/0121862 A1 | 5/2015 | Wade et al. |
| 2016/0032845 A1 | 2/2016 | Boyer et al. |
| 2016/0032846 A1 | 2/2016 | Boyer et al. |
| 2016/0032869 A1 | 2/2016 | Boyer et al. |

* cited by examiner

TWO-PORT INTEGRATED EXHAUST MANIFOLD FOR AN INTERNAL COMBUSTION ENGINE HAVING THREE CYLINDERS

FIELD

The present description relates generally to an integrated exhaust manifold for an internal combustion engine including three cylinders.

BACKGROUND/SUMMARY

Internal combustion engines, such as a gasoline engine, produce a variety of waste gases that are expelled from the cylinders through the cylinder head during operation. A method of managing these gases is to route them away from the cylinder head using an exhaust manifold. The exhaust manifold unifies the expelled waste gases from the cylinders through a series of channels known as runners. Multiple runners can combine to form a larger outlet known as a port (e.g., manifold exhaust port). The output from the port can then be directed towards the desired location such as a turbocharger turbine, exhaust gas recirculation (EGR) system, the atmosphere, etc. (or some combination thereof). An exhaust manifold that exists as an entity outside of the cylinder head occupies additional volume within the engine compartment and contributes additional weight to the overall system. It can also be cumbersome to navigate when repairs on the engine (or its components) are performed and space is limited. Attempts to address this problem of limited space include reducing the footprint of the exhaust manifold by incorporating it directly into the cylinder head as an integrated exhaust manifold (IEM). One such example of a single-port IEM is shown in WO 2013/045018.

However, the inventors herein have recognized potential issues with such systems. As one example, for a single-port IEM that is utilized in a three-cylinder engine, exhaust pulse interactions can occur when the runners join within the cylinder head leading to flow loss. The additional volume of the cylinder head required to join the runners can also reduce flow velocities. This can lead to a reduction in the energy supplied to a turbocharger and degradation of engine performance. While one approach may utilize a two-port external exhaust manifold, such as U.S. Patent No. 2014/0283799, this particular external solution leads to the issues described previously such as additional volume requirements and additional weight, as well as the increased cost of the manifold itself.

In one example, the issues described above may be addressed by an integrated exhaust manifold, comprising: first and second manifold exhaust ports; a first set of runners from a first cylinder; a second set of runners from a second cylinder; and a third set of runners from a third cylinder, where a first runner of the third set merges with the first set of runners at the first manifold exhaust port and a second runner of the third set merges with the second set of runners at the second manifold exhaust port. In this way, the integrated exhaust manifold may occupy a reduced volume, contribute less weight, and reduce exhaust communication between the first cylinder and second cylinder (which may be outer cylinders with the third cylinder positioned between the first and second cylinders) to reduce pulse interactions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5 are shown approximately to scale.

DETAILED DESCRIPTION

Figure 1:
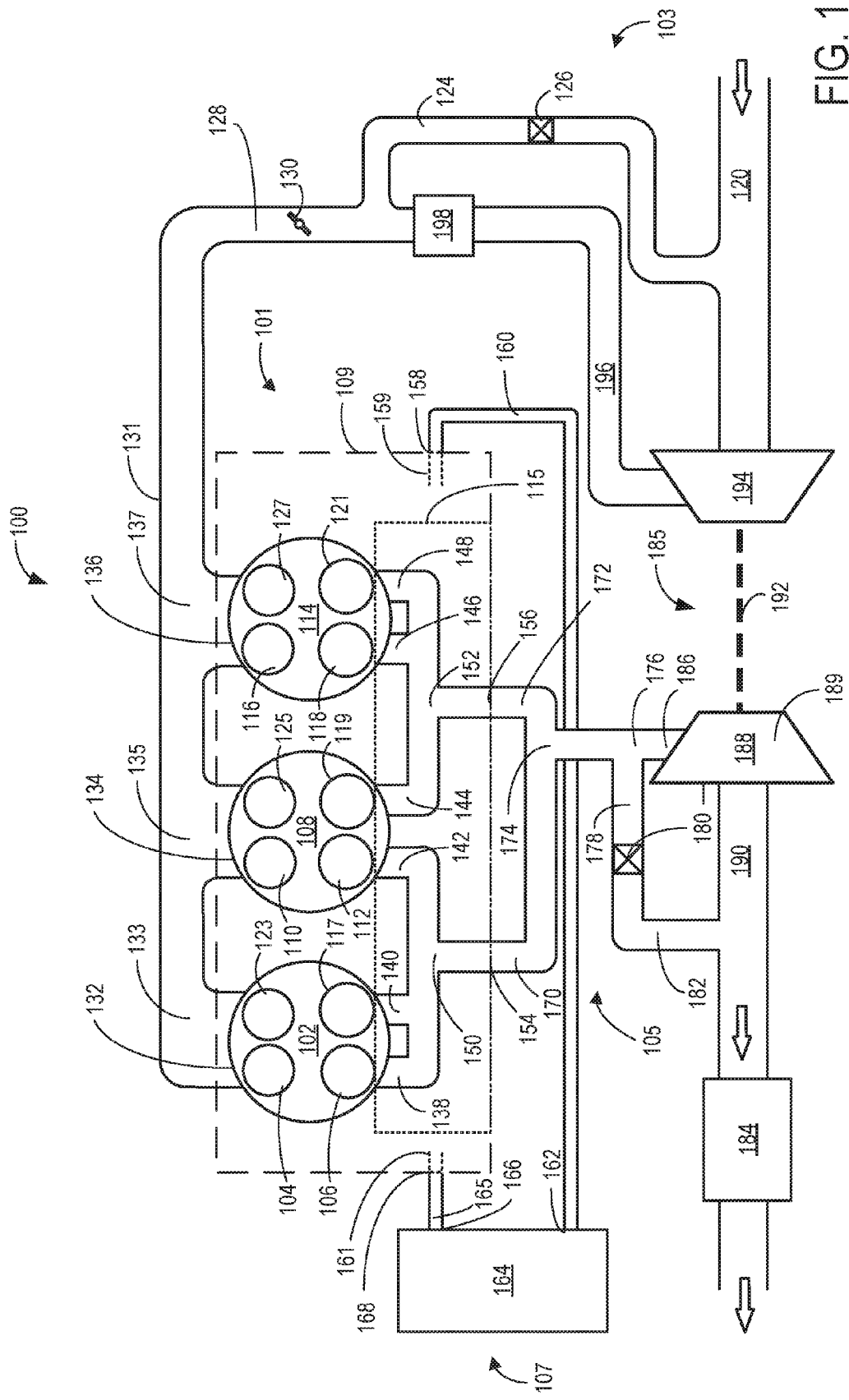
FIG. 1 portrays a schematic layout of a three-cylinder engine including a mono scroll turbocharger and a two-port integrated exhaust manifold.
Figure 2:
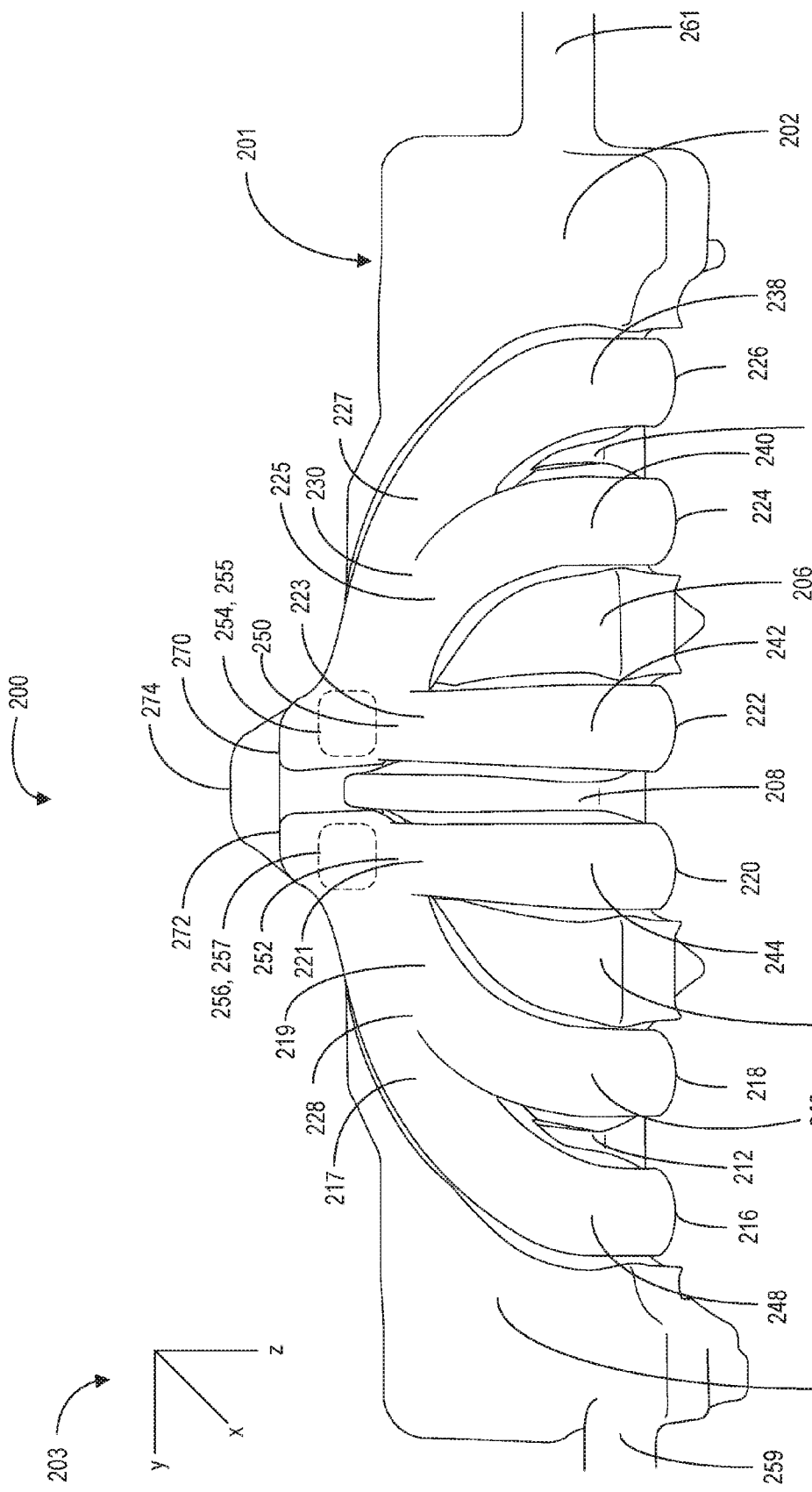
FIG. 2 depicts a perspective view of a two-port integrated exhaust manifold with exhaust runners and surrounding coolant passages represented as solid forms.
Figure 3:
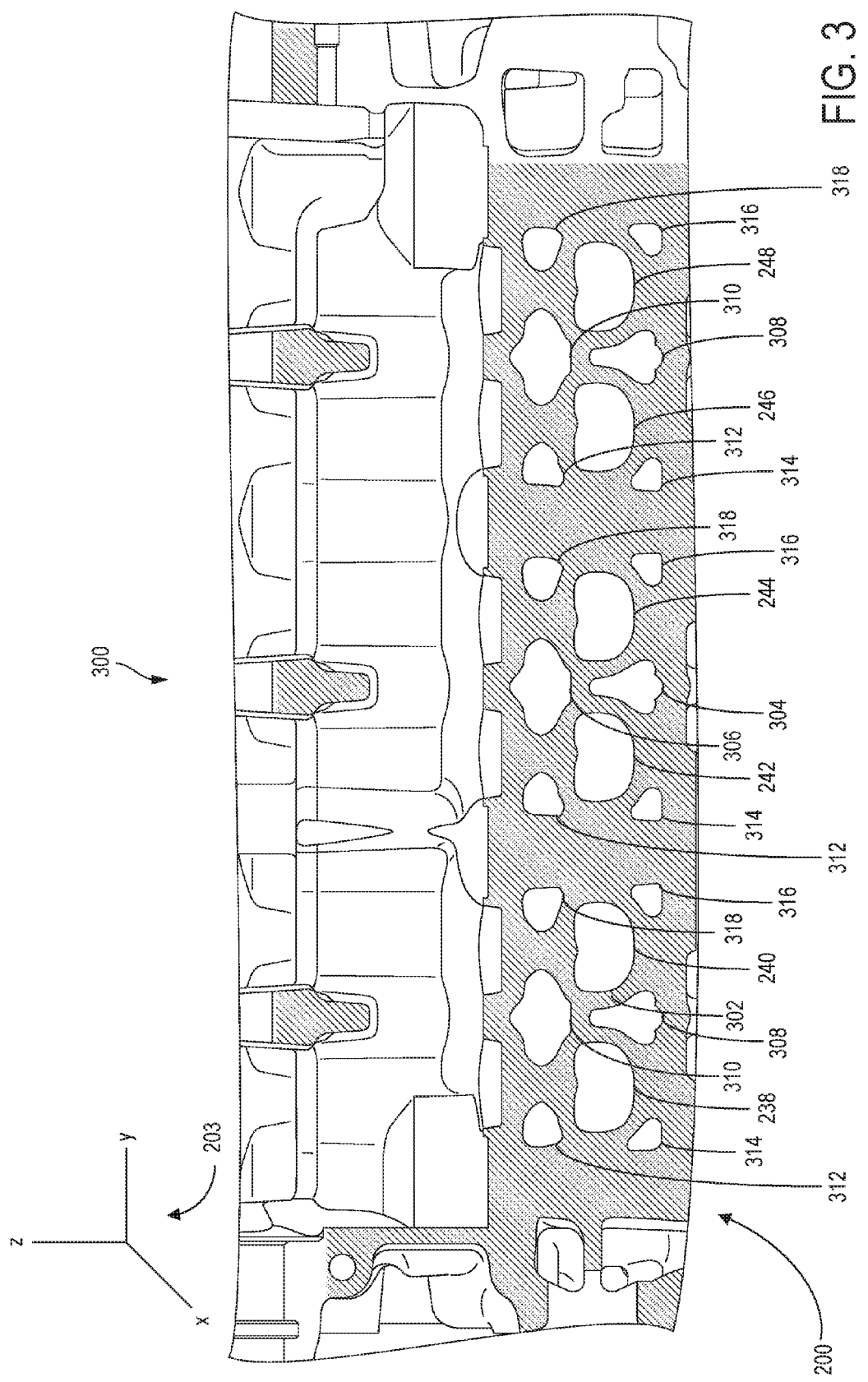
FIG. 3 depicts a sectional view of a cylinder head from a first side containing an integrated exhaust manifold with exhaust runners and surrounding coolant passages represented as hollow forms.
Figure 4:
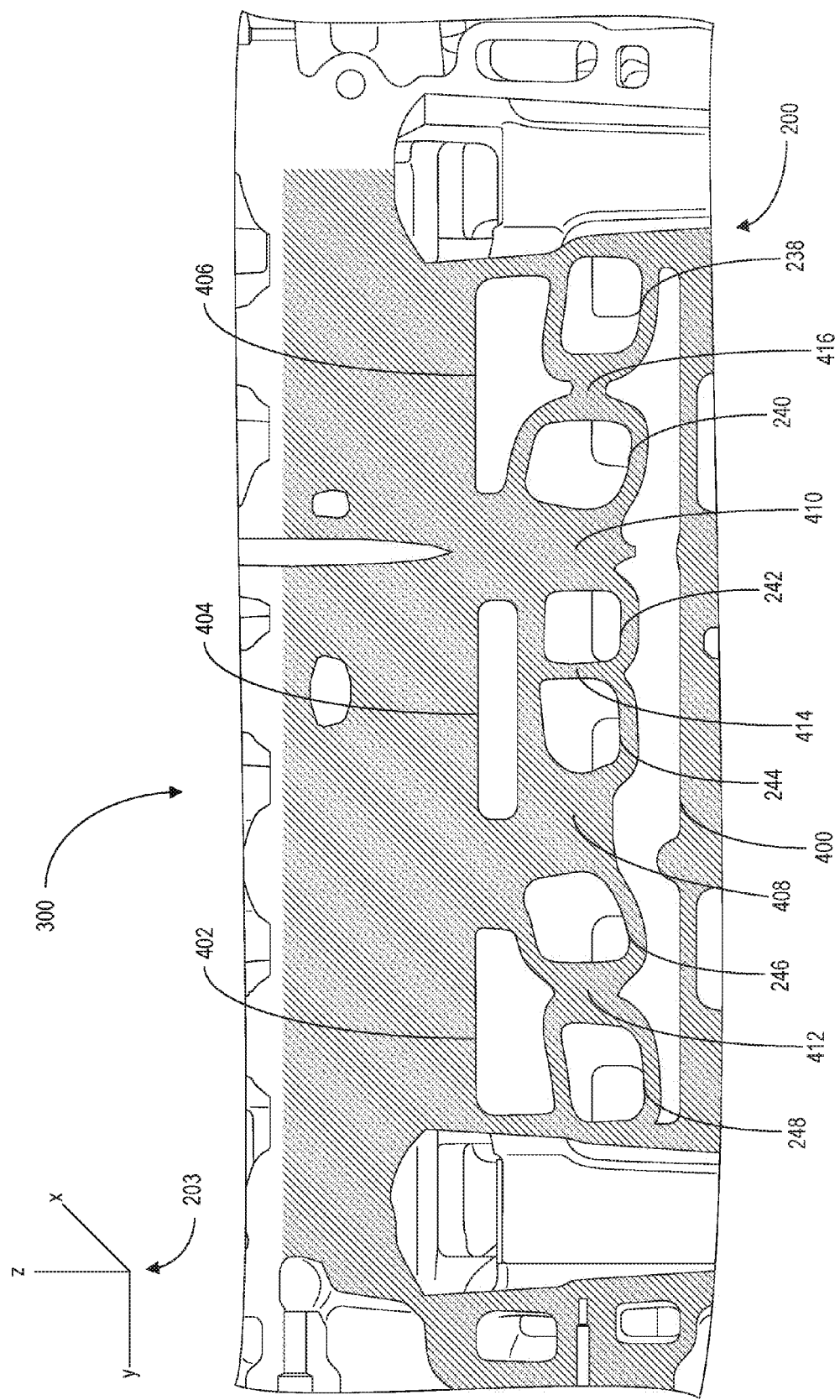
FIG. 4 depicts a sectional view of a cylinder head from a second side (opposite to the first side) containing an integrated exhaust manifold with exhaust runners and surrounding coolant passages represented as hollow forms.
Figure 5:
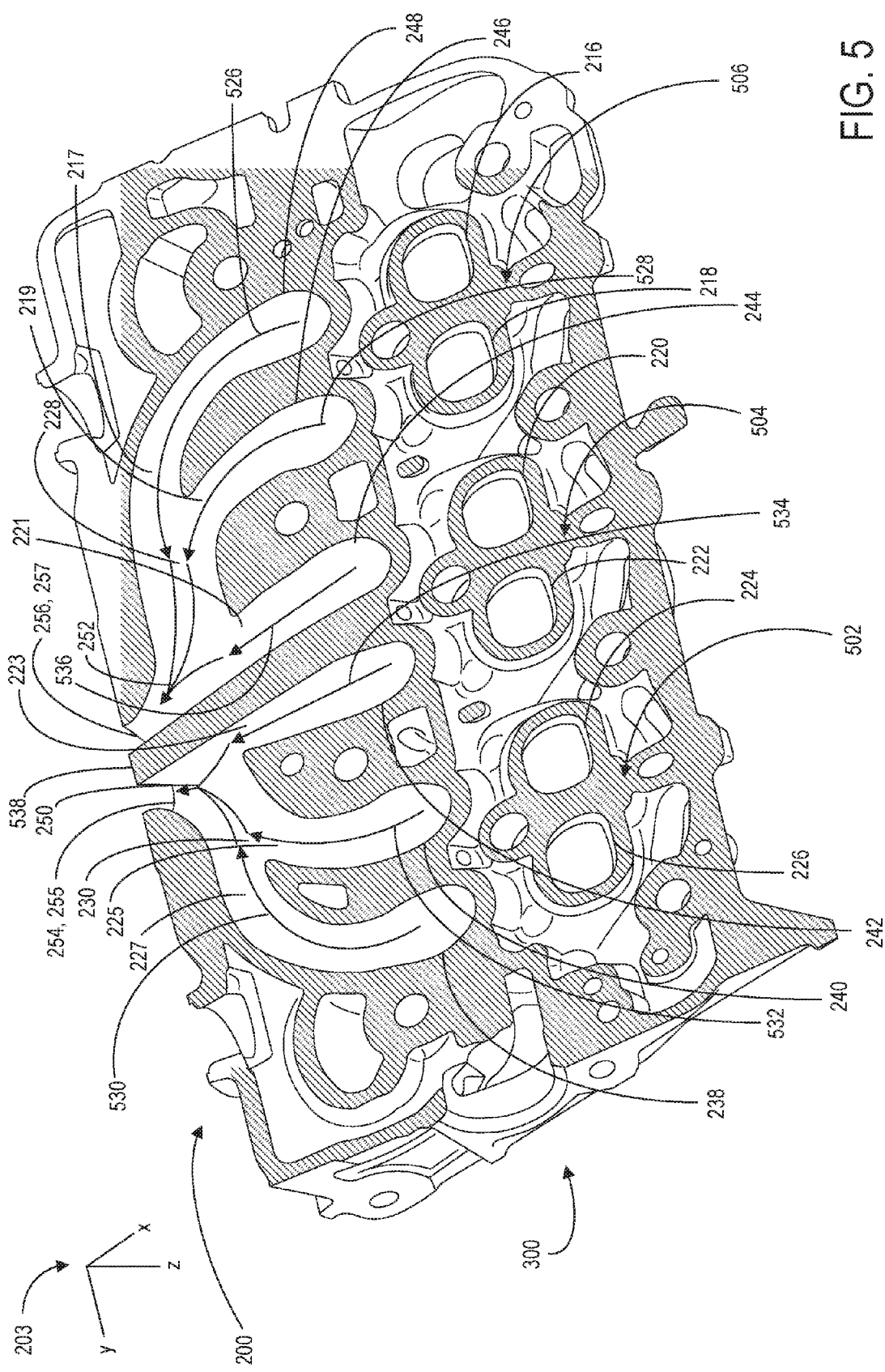
FIG. 5 depicts a perspective view of a cylinder head shown in cross-section containing a two-port integrated exhaust manifold with exhaust runners.
Figure 6:
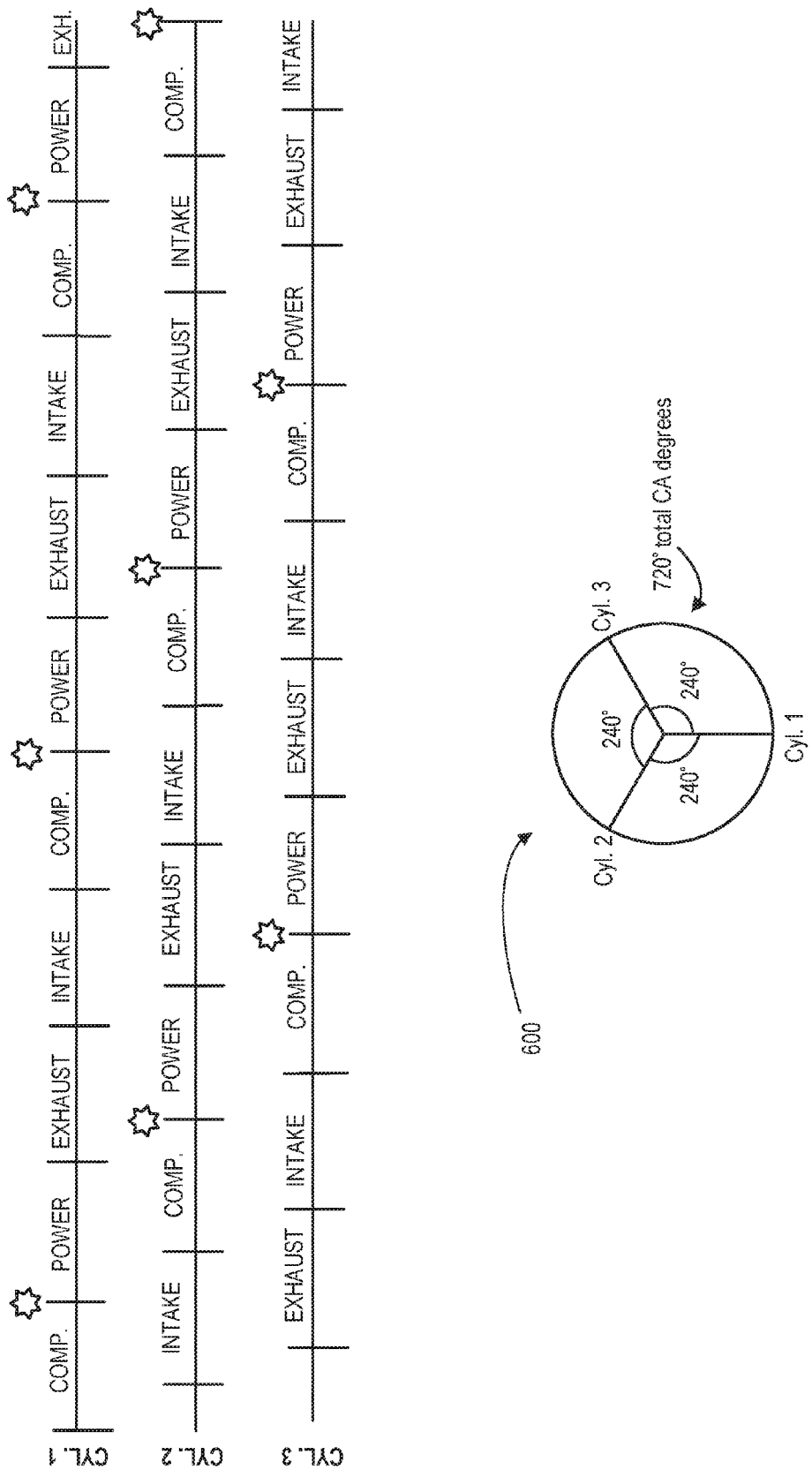
FIG. 6 shows a cylinder firing order for a three-cylinder engine.
Figure 7:
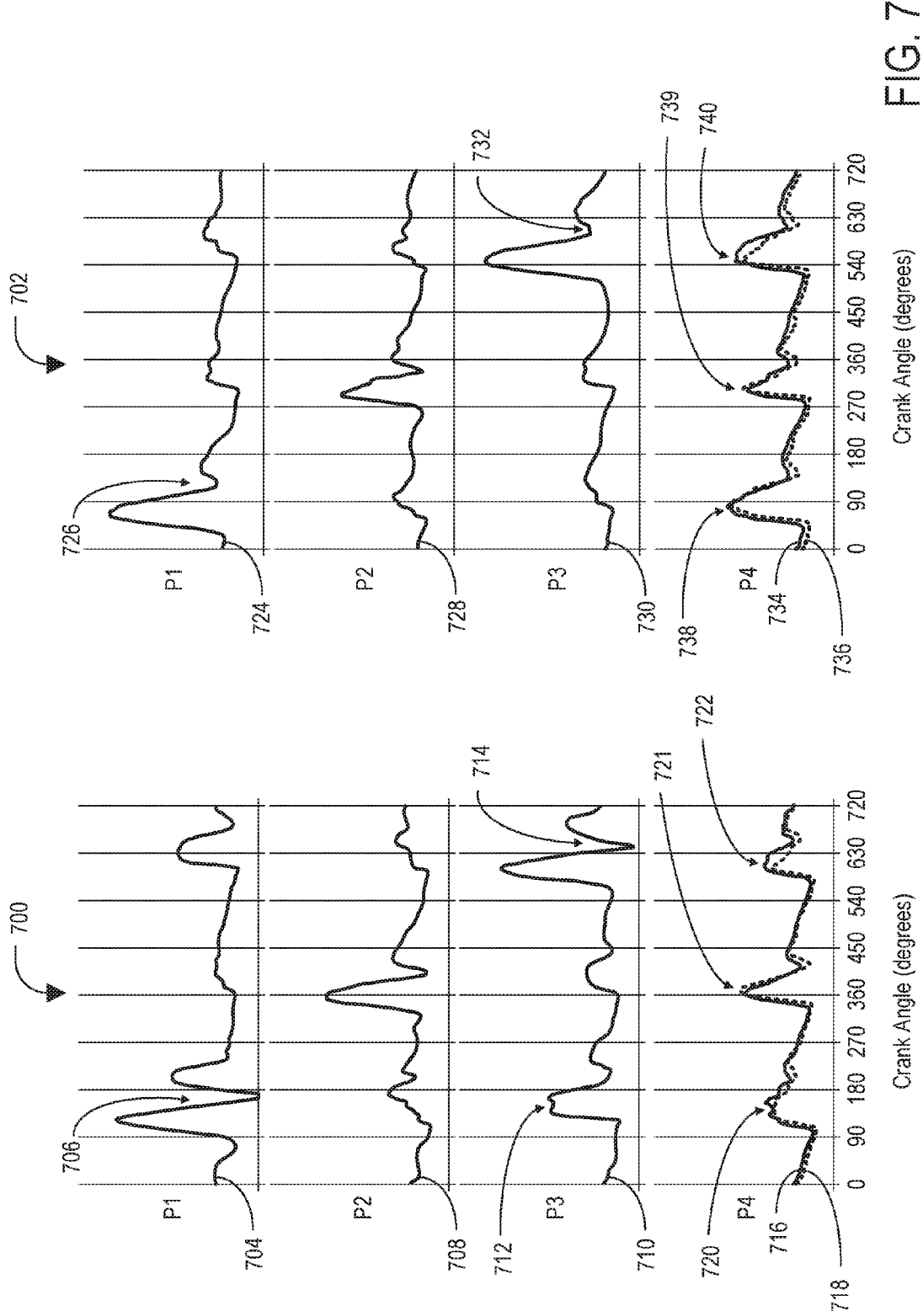
FIG. 7 shows a series of graphs depicting exhaust pressures at various points within an engine system.

The following description relates to systems and methods for a two-port integrated exhaust manifold for an engine including three cylinders. An engine may include three cylinders, a gas intake system, a gas exhaust system, a cooling system, and a turbocharger, as shown in FIG. 1. The gas exhaust system may include an integrated exhaust manifold (IEM) with multiple exhaust runners, as shown in FIGS. 1-2. The exhaust runners may be adjacent to coolant passages and may converge to two separate manifold exhaust ports in the IEM of the cylinder head, as shown in FIG. 2 and FIG. 5. The coolant passages may surround the runners and occupy the space between individual runners, as shown in FIGS. 3-4. Within the IEM, two runners from a first outer cylinder may converge with a first runner from an inner cylinder to a first manifold exhaust port while two runners from a second outer cylinder may converge with a second runner from the inner cylinder to a second manifold exhaust port, as shown in FIGS. 1-2 and FIG. 5. The three-cylinder engine may have a 1-2-3 cylinder firing order, as shown in FIG. 6. The configuration of exhaust runners to two separate manifold exhaust ports, as described above, may reduce exhaust pulse interaction between the outer cylinders and increase exhaust pressure at a turbine of the turbocharger and at an exhaust junction external to the cylinder head, as shown in FIG. 7. Exhaust may flow from the exhaust runners of the cylinders to two separate manifold exhaust ports while coolant (e.g., water) flows around and between the runners within the cylinder head, as shown by the method presented at FIG. 8. In this way, the 2-port integrated exhaust manifold configuration may increase the exhaust gas pressure at the turbine of the turbocharger to boost turbocharger effectiveness and may enable coolant to circulate through additional coolant passages in an interior of the cylinder head to reduce high cycle and low cycle fatigue on the cylinder head.

Similar components in FIGS. 1-8 are labeled similarly and may only be explained once below and not re-introduced with reference to each figure.

FIG. 1 shows a schematic diagram of an engine system 100 including a multi-cylinder internal combustion engine 101. Engine 101 may include a plurality of combustion chambers (e.g., cylinders) which may be capped on the top by cylinder head 109. In the example shown in FIG. 1, engine 101 includes three cylinders: 102, 108, and 114. It will be appreciated that the cylinders may share a single engine block (not shown) and a crankcase (not shown). The engine system 100 also includes a gas intake system 103, a gas exhaust system 105, and a cooling system 107. The embodiment additionally includes a turbocharger 185 connected with the gas intake system 103 and the gas exhaust system 105. Although the engine system 100 of FIG. 1 includes a turbocharger 185, alternate embodiments may not include a turbocharger (e.g., the engine system 100 may be naturally aspirated).

Each cylinder may receive intake air from intake manifold 131 via intake passage 128. Intake manifold 131 may contain intake passages 133, 135, and 137 coupled to the cylinders via intake ports 132, 134, and 136, respectively. Each intake port (e.g., cylinder intake port) may supply air and/or fuel to the cylinder it is coupled to for combustion. Each intake port can selectively communicate with the cylinder via one or more intake valves. Cylinders 102, 108, and 114 are shown in FIG. 1 with two intake valves each. For example, cylinder 102 has two intake valves 104 and 123, cylinder 108 has two intake valves 110 and 125, and cylinder 114 has two intake valves 116 and 127.

The three cylinders 102, 108, and 114 are arranged in an inline-3 configuration where cylinders 102 and 114 are positioned as outer cylinders, and cylinder 108 is the inner cylinder. In other words, cylinder 108 is arranged between cylinders 102 and 114 on the engine block. Herein, outer cylinders 102 and 114 may be described as flanking inner cylinder 108. While engine 101 is depicted as an inline-three engine with three cylinders, it will be appreciated that other embodiments may include a different number of cylinders, such as a V-6 engine with two banks including groupings of three cylinders each. In the embodiment of the V-6 engine, each grouping of three cylinders has the same cylinder arrangement (e.g., inline-3) as described above. In another embodiment, the engine may be an inline-6 engine with six cylinders arranged in two groupings of three cylinders having the same arrangement as shown in FIG. 1. In yet another embodiment, the engine may be a V-12 engine with two banks of six cylinders each. Each bank of six cylinders may include two groupings of three cylinders, with each grouping of three cylinders possessing the same cylinder arrangement as shown in FIG. 1.

Each cylinder may exhaust combustion gases via one or more exhaust valves into exhaust ports (e.g., cylinder exhaust ports) coupled thereto. Cylinders 102, 108, and 114 are shown in FIG. 1 with two cylinder exhaust ports, each including an exhaust valve disposed therein for exhausting combustion gases from a corresponding cylinder. For example, cylinder 102 has two cylinder exhaust ports 106 and 117, cylinder 108 has two cylinder exhaust ports 112 and 119, and cylinder 114 has two cylinder exhaust ports 118 and 121.

The engine 101 includes an integrated exhaust manifold 115 directly coupled to and integrated within the cylinder head 109. The integrated exhaust manifold 115 includes a series of exhaust passages carved into a block of the cylinder head 109 and may include additional fluid passages such as coolant passages within a block of the cylinder head 109. The integrated exhaust manifold (IEM) 115 directs exhaust gas in an organized manner from the cylinders 102, 108, and 114 to downstream exhaust passages of the gas exhaust system 105.

Each cylinder may be coupled to a respective manifold exhaust port for exhausting combustion gases. In the example of FIG. 1, a first internal exhaust junction 150 of the IEM receives exhaust gases from cylinder 102 via cylinder exhaust port 106 coupled to runner (e.g., exhaust runner) 138 and cylinder exhaust port 117 coupled to runner 140, and exhaust gases from cylinder 108 via cylinder exhaust port 112 coupled to runner 142. Exhaust gases entering the first internal exhaust junction 150 may converge and mix with one another. Exhaust gases travel from the first internal exhaust junction 150 to a first manifold exhaust port 154. Similarly, a second internal exhaust junction 152 receives exhaust gases exiting cylinder 114 via cylinder exhaust port 118 coupled to runner 146 and cylinder exhaust port 121 coupled to runner 148, and exhaust gases from cylinder 108 via cylinder exhaust port 119 coupled to runner 144. Exhaust gases entering the second internal exhaust junction 152 may converge and mix with one another. Exhaust gases travel from the second internal exhaust junction 152 to a second manifold exhaust port 156. Therefrom, the exhaust gases are directed via a pair of first and second external exhaust passages 170 and 172 (external to the cylinder head 109) to external exhaust junction 174 (also external to cylinder head 109), from which exhaust gases are distributed to other engine components (such as emission control device 184 and turbine 188 of turbocharger 185). It will be noted that in the example of FIG. 1, the runners 138, 140, 142, 144, 146, and 148, as well as first and second internal exhaust junctions 150 and 152 respectively, are integrated within the cylinder head 109 collectively as an integrated exhaust manifold (IEM) 115.

As shown in FIG. 1, first manifold exhaust port 154 may be fluidically coupled with first external exhaust passage 170 while second manifold exhaust port 156 may fluidically coupled with second external exhaust passage 172. Further, first and second external exhaust passages 170 and 172 may be fluidically coupled to each other via external exhaust junction 174. Thus, cylinders 102, 108, and 114 may exhaust their combustion gases into external exhaust junction 174 via first and second external exhaust passages 170 and 172. In the depicted example, first external exhaust passage 170, second external exhaust passage 172, and external exhaust junction 174 are not included in the cylinder head 109 and are external to cylinder head 109. Within the IEM 115 and surrounding its components (e.g., runners, junctions, etc.) are a plurality of coolant passages (e.g., such as coolant passages 159 and 161). The coolant passages are connected to one or more coolant inlets and outlets (e.g., such as coolant inlet 168 and coolant outlet 158) of the cylinder head 109 to facilitate the circulation of coolant through the cylinder head 109 and into/out of the IEM 115.

Upon entering the cylinder head 109 through a coolant inlet (e.g., coolant inlet 168) the coolant (e.g., water) passes into the IEM 115 and around its components via a plurality of coolant passages (e.g., coolant passage 161) integrated within the cylinder head 109. The coolant receives heat from the components of the IEM 115. The coolant then exits the IEM 115 through one or more coolant outlets (e.g., coolant outlet 158) in the cylinder head 109. The coolant then passes through the remainder of the cooling system 107 in order to reduce its thermal energy before re-entering the cylinder head 109 at coolant inlet 168. In the embodiment of FIG. 1, coolant outlet 158 is coupled to the inlet 162 of a radiator 164 via a first external coolant passage 160. The outlet 166 of the radiator 164 is then coupled to the coolant inlet 168 of the cylinder head 109 via second external coolant passage 165. The radiator 164 is utilized to reduce the thermal energy of the coolant. In alternate embodiments the cooling system 107 may contain additional devices (e.g., fans) to remove thermal energy from the coolant. It may also optionally or additionally circulate coolant through one or more additional devices (e.g., exhaust gas recirculation cooler).

Each cylinder may receive fuel from fuel injectors (not shown) coupled directly to the cylinder, as direct injectors, and/or from injectors coupled to the intake manifold, as port injectors. Further, air charges within each cylinder may be ignited via spark from respective spark plugs (not shown). In other embodiments, the cylinders of engine 101 may be operated in a compression ignition mode, with or without an ignition spark.

As described earlier in reference to FIG. 1, engine 101 may include a turbocharger 185. Turbocharger 185 may include an exhaust turbine 188 and an intake compressor 194 coupled on a common shaft 192. The blades of exhaust turbine 188 may be caused to rotate about the common shaft 192 as a portion of the exhaust gas stream discharged from engine 101 impinges upon the blades of the turbine. Intake compressor 194 may be coupled to exhaust turbine 188 such that compressor 194 may be actuated when the blades of exhaust turbine 188 are caused to rotate. When actuated, compressor 194 may then direct pressurized gas through boost chamber 196, and charge air cooler 198 to air intake manifold 131 from where it may then be directed to engine 101. In this way, turbocharger 185 may be configured for providing a boosted air charge to the engine intake.

Intake passage 120 may include an air intake throttle 130 downstream of charge air cooler 198. The position of throttle 130 can be adjusted via a throttle actuator (not shown) communicatively coupled to a controller (not shown). By modulating air intake throttle 130, while operating compressor 194, an amount of fresh air may be inducted from the atmosphere into engine 101, cooled by charge air cooler 198 and delivered to the engine cylinders at compressor (or boosted) pressure via intake manifold 131. To reduce compressor surge, at least a portion of the air charge compressed by compressor 194 may be recirculated to the compressor inlet. A compressor recirculation passage 124 may be provided for recirculating cooled compressed air from downstream of charge air cooler 198 to the compressor inlet. Compressor recirculation valve 126 may be provided for adjusting an amount of cooled recirculation flow recirculated to the compressor inlet.

Turbocharger 185 may be configured as a single or multi-scroll turbocharger wherein the exhaust turbine 188 includes one or more scrolls. In the depicted embodiment, exhaust turbine 188 includes one scroll 189. Accordingly, turbocharger 185 may be a mono scroll (or single scroll) turbocharger with one gas entry path flowing into, and through, exhaust turbine 188. The disclosed configuration of the IEM 115 (e.g., the 2-port configuration described above) allows for a reduction in exhaust pulse interactions between the outer cylinders without the need for a dual scroll turbocharger. In other words, the 2-port IEM configuration can reduce pulse interactions between the outer cylinders when a single scroll turbocharger is utilized. A dual scroll turbocharger has an increased component cost and occupies more space compared with a single scroll turbocharger. It is therefore advantageous to utilize the 2-port IEM configuration with a single scroll turbocharger in order to reduce pulse interactions, cost, and space occupied.

In the example of FIG. 1, scroll 189 is shown receiving exhaust from cylinders 102, 108, and 114 via plenum 186 coupled to junction 176. Therefore, exhaust may be directed from the first outer cylinder 102, the inner cylinder 108, and the second outer cylinder 114 to the scroll 189 of mono scroll turbocharger 185.

Exhaust turbine 188 may include at least one wastegate to control an amount of boost provided by said exhaust turbine. As shown in FIG. 1, a common wastegate 180 may be included in bypass passage 178 coupled between an inlet and outlet of the exhaust turbine 188 to control an amount of exhaust gas bypassing exhaust turbine 188. Thus, a portion of exhaust gases flowing towards scroll 189 from plenum 186 may be diverted via bypass passage 178 past wastegate 180 into bypass passage 182. Exhaust gases exiting turbine exhaust 188 via a passage 190 and/or wastegate 180 via the bypass passage 182 may pass through emission control device 184 and may exit the vehicle via a tailpipe (not shown). The emission control device 184 may be a three-way catalyst (TWC), NOx trap, various other emission control devices, or combinations thereof.

Returning now to cylinders 102, 108, and 114 as described earlier, each cylinder comprises two intake valves and two exhaust valves. Herein, each intake valve is actuatable between an open position allowing intake air into a respective cylinder and a closed position substantially blocking intake air from the respective cylinder. Intake valves 104, 123, 110, 125, 116, and 127 are actuated by a common intake camshaft (not shown). The intake camshaft includes a plurality of intake cams (not shown) configured to control the opening and closing of the intake valves. Each intake valve may be controlled by one or more intake cams, which will be described further below. In some embodiments, one or more additional intake cams may be included to control the intake valves. Further still, intake actuator systems may enable the control of intake valves.

Each exhaust valve is actuatable between an open position allowing exhaust gas out of a respective cylinder and a closed position substantially retaining gas within the respective cylinder. The exhaust valves of cylinder exhaust ports 106, 117, 112, 119, 118, and 121 are actuated by a common exhaust camshaft (not shown). Exhaust camshaft includes a plurality of exhaust cams (not shown) configured to control the opening and closing of the exhaust valves. Each exhaust valve may be controlled by one or more exhaust cams, which will be described further below. In some embodiments, one or more additional exhaust cams may be included to control the exhaust valves. Further, exhaust actuator systems may enable the control of exhaust valves.

Intake valve actuator systems and exhaust valve actuator systems may further include push rods, rocker arms, tappets, etc. (not shown). Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. In some examples, exhaust valves and intake valves may be actuated by a common camshaft. However, in alternate embodiments, at least one of the intake valves and/or exhaust valves may be actuated by its own independent camshaft or other device.

FIGS. 2-5 show perspective views of an embodiment of a 2-port integrated exhaust manifold (such as IEM 115 shown by FIG. 1) configured to be coupled with three cylinders of an engine (such as cylinders 102, 108, and 114 of engine 101 shown by FIG. 1). FIG. 2 shows a 2-port IEM in perspective view with its components (exhaust runners, water passages, ports, etc.) represented as solid forms. FIG. 3 shows the embodiment of the 2-port IEM of FIG. 2 in a cross-sectional view with the components mentioned above as hollow passages (e.g., voids) within the IEM of a cylinder head. FIG. 4 shows an alternate cross-sectional view of the 2-port IEM and cylinder head configuration of FIG. 3 from an opposite side (e.g., parallel but opposing) of the cylinder head. For example, FIG. 3 is a cross-sectional end view of the 2-port IEM viewed from an inlet, or cylinder side of the IEM and FIG. 4 is a cross-sectional end view of the 2-port IEM viewed from an outlet, or manifold exhaust port side of the IEM. FIG. 5 shows a perspective (and approximately isometric) cross-section of the 2-port IEM and cylinder head configuration of FIGS. 3-4.

FIG. 2 depicts a perspective view of an embodiment of a 2-port integrated exhaust manifold (IEM) 200 (such as the 2-port IEM 115 of FIG. 1), with exhaust runners and surrounding water passages represented as solid forms. The cylinder head, engine block, and other components/systems are not shown. Axes 203 are provided for perspective reference between FIGS. 2-5.

Components similar to those mentioned previously above during the discussion of schematic representation FIG. 1 can be seen in FIG. 2 approximately to scale. Exhaust runners 238 and 240 are coupled with a first outer cylinder (such as cylinder 102 shown by FIG. 1) via cylinder exhaust port 226 and cylinder exhaust port 224 respectively. Each cylinder exhaust port, including cylinder exhaust ports 226 and 224, serve as inlets to each corresponding exhaust runner, such as runners 238 and 240. Further, each cylinder exhaust port may serve as an interface between a corresponding cylinder and runner.

The exhaust runners 238 and 240 are fluidically coupled to inlet openings 227 and 225 respectively downstream of the cylinder exhaust ports 226 and 224 respectively. Exhaust runners 242 and 244 are coupled with an inner cylinder (such as cylinder 108 shown by FIG. 1) via cylinder exhaust port 222 and cylinder exhaust port 220 respectively. The exhaust runners 242 and 244 are fluidically coupled to inlet openings 223 and 221 respectively downstream of the cylinder exhaust ports 222 and 220 respectively. Exhaust runners 246 and 248 are coupled with a second outer cylinder (such as cylinder 114 shown by FIG. 1) via cylinder exhaust port 218 and cylinder exhaust port 216 respectively. The exhaust runners 246 and 248 are fluidically coupled to inlet openings 219 and 217 respectively downstream of the cylinder exhaust ports 218 and 216 respectively. The exhaust flows from inlet openings 219 and 217 (from exhaust runners 246 and 248 respectively) merge together at joint 228 while the flows from inlet openings 227 and 225 (from exhaust runners 238 and 240 respectively) merge together at joint 230. Joints 228 and 230 are positioned downstream of the cylinders, in a direction of exhaust flow. Downstream of these junctions, exhaust flow from inlet openings 227, 225, and 223 (from runners 238, 240, and 242 respectively) join together at first internal exhaust junction 250, and exhaust flow from inlet openings 221, 219, and 217 (from runners 244, 246, and 248 respectively) join together at second internal exhaust junction 252. Internal exhaust junctions 250 and 252 are both internal to a cylinder head (such as cylinder head 109 shown by FIG. 1). First internal exhaust junction 250 is coupled with first manifold exhaust port 254 while second internal exhaust junction 252 is coupled with second manifold exhaust port 256.

The first manifold exhaust port 254 includes a single outlet opening 255 and the second manifold exhaust port 256 includes a single outlet opening 257. The two manifold exhaust ports (254 and 256) exhaust gases traveling through the exhaust runners of the IEM 200 (e.g., exhaust runners 238, 240, 242, 244, 246, and 248) via the single outlet opening 255 and the single outlet opening 257. In this way, inlet openings 223, 225, and 227 are fluidically coupled to the single outlet opening 255 of the first manifold exhaust port 254, and inlet openings 217, 219, and 221 are fluidically coupled to the single outlet opening 257 of the second manifold exhaust port 256. The two manifold exhaust ports (254 and 256) then join via external exhaust passages 270 and 272 (external to the IEM and cylinder head) respectively to form external exhaust junction 274 which is coupled to a turbine (such as turbine 188 shown by FIG. 1) and other components of the gas exhaust system (such as gas exhaust system 105 shown by FIG. 1).

Upstream of the internal exhaust junctions 250 and 252 as well as the joints 228 and 230, each pair of exhaust runners coupled with a cylinder (e.g., exhaust runners 238 and 240 coupled with a first cylinder, exhaust runners 242 and 244 coupled with a second cylinder, and exhaust runners 246 and 248 coupled with a third cylinder) has a distance of separation between each other. The exhaust runner pair 238 and 240 is spatially separated from the exhaust runner pair 242 and 244, the exhaust runner pair 242 and 244 is spatially separated from the exhaust runner pair 246 and 248, and the exhaust runner pair 246 and 248 is spatially separated from the exhaust runner pair 238 and 240. Similarly, the exhaust runners within each pair are also spatially separated from each other. For example, exhaust runner 238 is spatially separated (e.g., spaced apart) from exhaust runner 240, exhaust runner 242 is spatially separated from exhaust runner 244, and exhaust runner 246 is spatially separated from exhaust runner 248.

Other embodiments may include exhaust runners of differing shape, size, and relative spacing compared to those parameters displayed by FIG. 2. Similarly, other embodiments may include cylinder exhaust ports, manifold exhaust ports, inlets, junctions, and other elements of the integrated exhaust manifold that differ in shape, size, and relative spacing compared to those parameters displayed by FIG. 2.

The IEM 200 includes a coolant jacket 201. The coolant jacket 201 includes a series of voids in which coolant is permitted to flow. The voids surround the components of the IEM 200 (e.g., exhaust runners, ports, etc.) and are separated from the components by walls internal to the IEM 200. Coolant passages 259 and 261 (e.g., such as coolant passages 159 and 161) can be seen opposite to each other at the far ends of the coolant jacket 201 (e.g., one on each end of the longest length of the coolant jacket) and parallel to an axis containing the inline cylinders (e.g., such as cylinders 102, 108, and 114 shown by FIG. 1, and y-axis shown by axes 203). Coolant circulation regions 202 and 214 can be seen alongside exhaust runners 238 and 248, respectively. Coolant circulation region 214 is fluidically coupled with coolant passage 259 while coolant circulation region 202 is fluidically coupled with coolant passage 261. The coolant jacket 201 also includes a plurality of coolant circulation regions between the exhaust runners of the IEM 200, such as region 212 between exhaust runners 246 and 248, region 210 between exhaust runners 244 and 246, region 206 between exhaust runners 240 and 242, and region 204 between exhaust runners 238 and 240. The separation between the exhaust runners coupled with the inner cylinder (e.g., exhaust runners 242 and 244) in the 2-port IEM 200 permits an additional coolant circulation region 208 between exhaust runners 242 and 244 to increase cooling of the components of the IEM 200. The coolant circulation regions (e.g., 202, 204, 206, 208, 210, 212, and 214) and the coolant passages (e.g., 259 and 261) may be interconnected to allow coolant to flow between the passages and regions through the IEM 200.

Other embodiments may include coolant passages and coolant circulation regions of differing shape, size, relative spacing, and quantity compared to those parameters displayed by FIG. 2. Additionally, in alternate embodiments the engine may have six cylinders arranged in two banks of three cylinders each (e.g., V6 engine) where the each bank of three cylinders has the same IEM configuration (e.g., the same exhaust runner configuration and the same coolant passage configuration) shown in FIGS. 1-5.

FIG. 3 shows a cross-sectional end view of a cylinder head 300 including the IEM 200. A number of exhaust runners are shown (e.g., exhaust runners 238, 240, 242, 244, 246, and 248) that correspond with the exhaust runners shown by FIG. 2. While FIG. 2 depicted the components of the IEM (e.g., exhaust runners, coolant regions, etc.) as solid forms for illustrative purposes, FIG. 3 shows the IEM as a block with hollow passages (e.g., voids) bored internally through the IEM 200 of the cylinder head 300 (e.g., such as the cylinder head 109 shown by FIG. 1). Each pair of exhaust runners is coupled to a cylinder (such as the cylinders 102, 108, and 114 of FIG. 1). In this example, exhaust runners 238 and 240 are coupled with a first cylinder (such as cylinder 102 of FIG. 1), exhaust runners 242 and 244 are coupled with a second cylinder (such as cylinder 108 of FIG. 1), and exhaust runners 246 and 248 are coupled with a third cylinder (such as cylinder 114 of FIG. 1). FIG. 3 also shows a number of coolant passages surrounding the exhaust runners (e.g., passages 304, 306, 308, 310, 312, 314, 316, and 318) that may be included as part of a coolant jacket (e.g., such as the coolant jacket 201 shown by FIG. 2). The coolant passages are spatially separated from the exhaust runners by interior surfaces of the IEM 200, such as interior wall 302. Due to their spatial separation, the exhaust runners and coolant passages are not in fluidic communication with each other (e.g., they do not exchange coolant or gases with each other).

The exhaust runners may be circumferentially surrounded by a series of interconnected coolant passages of the coolant jacket. For example, exhaust runner 238 is circumferentially surrounded by its adjacent coolant passages 308, 310, 312, and 314, which may be interconnected. The coolant passages 310 and 312 are arranged in-line along a y-axis and in a positive z-axis direction (as shown by axes 203) relative to the exhaust runner 238 while the coolant passages 308 and 314 are arranged in-line along the y-axis and in a negative z-axis direction relative to the exhaust runner 238. Each pair of exhaust runners is flanked (e.g., surrounded by) a plurality of coolant passages (e.g., coolant passages 312, 314, 316, and 318) that occupy the space adjacent to the pair and, as stated previously, the exhaust runners and coolant passages are separated by interior walls of the IEM 200. The pair of exhaust runners 238 and 240 coupled to the first cylinder and the pair of exhaust runners 246 and 248 coupled to the third cylinder have a pair of central coolant passages 308 and 310 occupying the gap between the exhaust runners of each pair. The 2-port IEM (e.g., as depicted in FIG. 1-5) allows for an additional set of central coolant passages 304 and 306 to exist in the space between the exhaust runners coupled with the inner cylinder (e.g., exhaust runners 242 and 244).

Opposed to a 1-port IEM in which the exhaust runners coupled with the inner cylinder merge together within the IEM, the exhaust runners coupled to the inner cylinder in the example of the 2-port IEM do not merge within the IEM. Due to this difference in configuration, the example of the 2-port IEM permits coolant to occupy additional passages between the exhaust runners coupled to the inner cylinder, thereby increasing coolant contact with the interior walls of the IEM and reducing stress on the IEM. The coolant passages of FIG. 3 may merge together at some location within the cylinder head 300 to form passages of differing shape as described in the discussion of FIG. 4 and/or may be formed by the coolant passages shown by FIG. 2.

FIG. 4 shows the embodiment of the cylinder head 300 and 2-port IEM 200 from FIG. 3 in an alternate cross-sectional view from an opposite side (e.g., parallel but opposing) of the cylinder head 300 relative to the view of FIG. 3. Exhaust runners 246 and 248 are shown separated by an interior wall 412 of the IEM 200 of the cylinder head 300. The two exhaust runners 246 and 248 are adjacent to coolant passages 402 and 400 (which may be interconnected with each other and/or formed by the coolant jacket components shown by FIGS. 2-3). The coolant passage 400 is positioned along a negative direction of the z-axis (as shown by axes 203) relative to the exhaust runners 246 and 248 while the coolant passage 402 is positioned along a positive direction of the z-axis relative to the exhaust runners 246 and 248. Exhaust runner 246 is separated from exhaust runner 244 by interior wall 408, and exhaust runner 244 is separated from exhaust runner 242 by interior wall 414. Exhaust runners 244 and 242 are adjacent to coolant passages 404 and 400, with coolant passage 400 positioned along a negative direction of the z-axis relative to the exhaust runners 244 and 242 while the coolant passage 404 is positioned along a positive direction of the z-axis relative to the exhaust runners 244 and 242. Exhaust runner 242 is separated from exhaust runner 240 by interior wall 410, and exhaust runner 238 is separated from exhaust runner 240 by interior wall 416. Both exhaust runners 240 and 238 are adjacent to coolant passages 406 and 400, with coolant passage 400 positioned along a negative direction of the z-axis relative to the exhaust runners 240 and 238 while the coolant passage 406 is positioned along a positive direction of the z-axis relative to the exhaust runners 240 and 238.

As also seen in FIG. 3, the exhaust runners 248, 246, 244, 242, 240, and 238 are all spatially separated from the coolant passages 400, 402, 404, and 406. In other words, the runners and coolant passages are not in fluidic communication with each other. The view depicted by FIG. 4 shows a cross-section of a segment of the cylinder head. There may be other segments (not shown) that include additional coolant passages and/or segments in which the coolant passages merge together. Additionally, other segments may include the merging of runners 238, 240, and 242 to a first manifold exhaust port (e.g., manifold exhaust port 254 of FIG. 2) as well as the merging of runners 244, 246, and 248 to a second manifold exhaust port (e.g., manifold exhaust port 256 of FIG. 2).

FIG. 5 depicts a third cross-sectional view of the cylinder head 300 and IEM 200 along a plane that intersects the planes of the views shown in FIG. 3-4. FIG. 5 shows the IEM 200 including the exhaust runners (e.g., exhaust runners 238, 240, 242, 244, 246, and 248) routed through and contained within an interior of the IEM 200 of the cylinder head 300. As explained above, the internal exhaust runners (e.g., passages) of the IEM 200 are used to route exhaust gases away from the cylinders (e.g., such as cylinders 102, 108, and 114 shown by FIG. 1), through the IEM 200, and out of the IEM 200 to external exhaust passages outside of the cylinder head 300. Further, FIG. 5 shows how the exhaust runners are spatially separated from one another by the interior walls of the IEM 200 of the cylinder head 300.

The exhaust runner 238 is fluidically coupled to the cylinder exhaust port 226 (also shown in FIG. 2) of a first outer cylinder 502 (e.g., such as cylinder 102 shown by FIG. 1) and the exhaust runner 240 is fluidically coupled to the cylinder exhaust port 224 (also shown in FIG. 2) of the first cylinder 502. The exhaust runners 242 and 244 respectively are fluidically coupled to the cylinder exhaust ports 222 and 220 (also shown in FIG. 2) respectively of a first inner cylinder 504 (e.g., such as cylinder 108 shown by FIG. 1). The exhaust runners 246 and 248 respectively are fluidically coupled to the cylinder exhaust ports 218 and 216 (also shown in FIG. 2) respectively of a second outer cylinder 506 (e.g., such as cylinder 114 shown by FIG. 1).

Exhaust gases travel from cylinder exhaust port 226 through exhaust runner 238 and through the inlet opening 227 along a path indicated approximately by arrow 530. Exhaust gases travel from cylinder exhaust port 224 through exhaust runner 240 and through the inlet opening 225 along a path indicated approximately by arrow 532. Exhaust gases travel from cylinder exhaust port 222 through exhaust runner 242 and through the inlet opening 223 along a path indicated approximately by arrow 534. Exhaust gases from inlet openings 227 and 225 (of exhaust runners 238 and 240 respectively) converge and mix at the first joint 230. The gases from the first joint converge and mix with gases from the inlet opening 223 of exhaust runner 242 at the first internal exhaust junction 250 to form a flow originating from each of the three cylinder exhaust ports (226, 224, and 222). This flow then exits the IEM and cylinder head 300 via the single outlet opening 255 of the first manifold exhaust port 254.

Similarly, exhaust gases travel from cylinder exhaust port 220 through exhaust runner 244 and through the inlet opening 221 along a path indicated approximately by arrow 536. Exhaust gases travel from cylinder exhaust port 218 through exhaust runner 246 and through the inlet opening 219 along a path indicated approximately by arrow 528. Exhaust gases travel from cylinder exhaust port 216 through exhaust runner 248 and through the inlet opening 217 along a path indicated approximately by arrow 526. Exhaust gases from inlet openings 219 and 217 (of exhaust runners 246 and 248 respectively) converge and mix at the second joint 228. The gases from the second joint 228 converge and mix with gases from the inlet opening 221 of exhaust runner 244 at a second internal exhaust junction 252 to form a flow originating from each of the three cylinder exhaust ports (220, 218, and 216). This flow then exits the cylinder head 300 via the single outlet opening 257 of the second manifold exhaust port 256.

Between the exhaust runners 242 and 244 of the inner cylinder 504 is a region of separation 538. The region of separation 538 is formed from (and is integrated with) the IEM 200 of the cylinder head 300. The exhaust runners 242 and 244 of the inner cylinder are fluidically isolated from each other by the region of separation 538. As a result, the exhaust runners 238, 240, and 242 converge flows at a point (e.g., first internal exhaust junction 250) within the cylinder head 300 but none of those flows (individually or combined) converge with the flows of exhaust runners 244, 246, or 248. Similarly, the exhaust runners 244, 246, and 248 converge flows at a point (e.g., second internal exhaust junction 252) within the cylinder head 300 but none of those flows (individually or combined) converge with the flows of runners 238, 240, or 242. The region of separation may contain coolant passages (as shown in FIGS. 2-4) or may be a solid volume within the cylinder head 300. In this way, the flow from cylinders (e.g., cylinders 502, 504, and 506) is divided between the two manifold exhaust ports (e.g., manifold exhaust ports 254 and 256).

In this way, the exhaust flows from runners 238, 240, and 242 may converge and mix upstream of the first manifold exhaust port 524. Similarly, the exhaust flows from exhaust runners 244, 246, and 248 may converge and mix upstream of the second manifold exhaust port 526. The exhaust flows from exhaust runners 242 and 244 do not mix and converge upstream of either the first or second manifold exhaust ports (524 and 526 respectively). However, the flows from exhaust runners 242 and 244 may mix and converge at a location downstream of the first and second manifold exhaust ports (524 and 526 respectively).

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Operation of engine 101, particularly, the firing order, will be described now in reference to FIG. 6 which depicts ignition timing diagrams for the three cylinders of engine 101. It will be appreciated that cylinders 1, 2, and 3 in FIG. 6 correspond to cylinders 102, 108, and 114 respectively, of FIG. 1, and cylinders 502, 504, and 506 of FIG. 5. For each diagram, cylinder number is shown on the y-axis and engine strokes are depicted on the x-axis. Further, ignition, and the corresponding combustion event, within each cylinder is represented by a star symbol between compression and power strokes within the cylinder. Further, additional diagram 600 portrays cylinder firing events in each cylinder around a circle representing 720 degrees of crank rotation.

In the example of FIG. 6, ignition and combustion events within the engine and between the three cylinders may occur at 240 CA (crank angle) degree intervals. Herein, firing events may occur at evenly spaced intervals. Likewise, each engine stroke within the three cylinders may occur at 240 CA degree intervals. For example, an exhaust stroke in cylinder 1 may be followed by an exhaust stroke in cylinder 2 at about 240 CA degrees after the exhaust stroke in cylinder 1. Similarly, the exhaust stroke in cylinder 2 may followed by an exhaust stroke in cylinder 3 after an interval of 240 CA degrees. Firing events in the engine may occur similarly. An example firing order for the three-cylinder engine may be 1-2-3-1-2-3. As illustrated at 600, cylinder 3 may be fired approximately 240 CA degrees after cylinder 2 is fired, cylinder 1 may be fired approximately 240 CA degrees after the firing event in cylinder 3, and cylinder 2 may be fired approximately 240 CA degrees after the firing event in cylinder 1. Thus, a method of operating an engine may comprise firing a first, second, and third cylinder of the three cylinders, each firing event separated by 240 degrees of crank angle (CA).

It will be appreciated that the even firing intervals of 240 CA degrees in the three-cylinder engine may be approximate. In one example, the firing interval between cylinder 3 and cylinder 1 may be 230 CA degrees. In another example, the firing interval between cylinder 3 and cylinder 1 may be 255 CA degrees. In yet another example, the firing interval between cylinder 3 and cylinder 1 may be exactly 240 CA degrees. Likewise, the firing interval between cylinder 1 and cylinder 2 may vary in a range between 230 CA degrees and 255 CA degrees. The same variation may apply to firing intervals between cylinder 2 and cylinder 3. Other variations may also be possible.

It may be appreciated that the firing order of 1-2-3 may enable increased balance and reduced NVH. For example, cylinder 1 may represents cylinder 502 of FIG. 5 (or cylinder 102 of FIG. 1) and is positioned as a first outer cylinder, cylinder 2 may represent cylinder 504 of FIG. 5 (or cylinder 108 of FIG. 1) and is positioned as a first inner cylinder, and cylinder 3 may represent cylinder 506 of FIG. 5 (or cylinder 114 of FIG. 1) and is positioned as a second outer cylinder. Based on the inline arrangement of the cylinders within the engine block, the firing order of 1-2-3 may provide increased balance and may reduce noise and vibrations. Further, noise and vibration may be more prominent during engine idle conditions and the 1-2-3 firing order may be a more suitable option for engine operation during these conditions.

The cylinder configuration and firing order depicted in FIG. 6 describes the operation of a three-cylinder engine. In another embodiment, the engine may have six cylinders arranged in two banks with each bank possessing a grouping of three cylinders (e.g., V6 engine) where each grouping of three cylinders has the same IEM configuration shown in FIG. 1-5. In this configuration the firing order may be 1-4-2-5-3-6, with cylinders 1, 2, and 3 residing in one grouping, while cylinders 4, 5, and 6 reside in the other grouping. All of the advantages inherent to the 2-port IEM configuration for a three-cylinder engine also apply to the embodiment of the V6 engine. In yet another embodiment, the engine may have six cylinders arranged inline (e.g., along a shared axis, as an I6 engine) as two groupings of three cylinders each, with each grouping of three cylinders possessing the same IEM configuration shown in FIG. 1-5. In this configuration the firing order may be 1-4-2-5-3-6, with cylinders 1, 2, and 3 residing in one grouping, while cylinders 4, 5, and 6 reside in the other grouping. All of the advantages inherent to the 2-port IEM configuration for a three-cylinder engine (and six-cylinder V6 engine) also apply to the embodiment of the I6 engine. In yet another embodiment, the engine may have twelve cylinders arranged in two banks of six cylinders each (e.g., V12 engine) where each bank of six cylinders has the same IEM configuration described in the discussion of the I6 engine above (e.g., each bank of six cylinders includes two groupings of three cylinders each, and each grouping of three cylinders possesses the same IEM configuration shown in FIG. 1-5). In this configuration the firing order may be 1-7-5-11-3-9-6-12-2-8-4-10, with cylinders 1-6 residing in one bank, while cylinders 7-12 reside in the other bank. All of the advantages inherent to the 2-port IEM configuration for a three-cylinder engine (and six-cylinder I6 and V6 engines) also apply to the embodiment of the V12 engine.

In an example of a 1-port IEM, the runners of cylinder 1 and the runners of cylinder 3 are in fluidic communication with one another within the cylinder head (e.g., within the IEM) and the pair of runners from cylinder 2 (e.g., the inner cylinder) converge together before leaving the IEM. As such, all runners from all three cylinder converge together at a single manifold exhaust port before leaving the IEM in the example of the 1-port IEM. As a result, the exhaust strokes of cylinder 1 and cylinder 3 are permitted to interfere with each other. This can lead to a reduction in exhaust gas pressures at the first external exhaust junction and the turbine inlet. In contrast, the example of the 2-port IEM (as represented in FIGS. 1-5) separates the runners from cylinder 1 (e.g., outer cylinder 102 of FIG. 1 or cylinder 502 of FIG. 5) and cylinder 3 (e.g., outer cylinder 114 or cylinder 506 of FIG. 5) and does not allow fluidic communication between cylinder 1 and 3 within the cylinder head (e.g., within the IEM 200 of FIGS. 2-5). This prevents reductions in exhaust gas pressures due to pulse interactions between the outer cylinders.

FIG. 7 details the relative decreases (in a 1-port IEM example) and increases (in a 2-port IEM example) in pressure at various points (e.g., at the cylinders, the first external exhaust junction, and the turbine inlet) in an engine system (e.g., engine system 100 shown by FIG. 1). Exhaust gas pressures for the 1-port IEM example are shown within column 700 while exhaust gas pressures for the 2-port IEM example are shown within column 702. In the example of the 1-port IEM, the runners from each cylinder all join into a single junction within the IEM (and therefore, within a cylinder head) and a single passage couples the junction to a single exhaust port (e.g., an aperture at the exterior surface of the cylinder head). As a result, the individual outputs of the runners from each cylinder are merged into a single output and there is no separation of exhaust flow from the three cylinders.

In contrast, column 702 depicts the exhaust gas pressures for the example of a 2-port IEM. In the example of the 2-port IEM (e.g., the IEM 115 of FIG. 1 and IEM 200 of FIGS. 2-5) two runners from a first outer cylinder join with a first runner of an inner cylinder to form a first junction within the IEM of a cylinder head. Similarly, two runners from a second outer cylinder join with a second runner of the inner cylinder to form a second junction within the IEM of the cylinder head. The first junction is then coupled to a first manifold exhaust port at an exterior surface of the cylinder head while the second junction is coupled to a second manifold exhaust port at the exterior surface of the cylinder head. The result is two manifold exhaust ports (e.g., outlets), with the first port receiving exhaust gas from two runners of the first outer cylinder and one runner of the inner cylinder while the second port receives exhaust gas from two runners of the second outer cylinder and one runners of the inner cylinder.

Columns 700 and 702 contain pressure plots P1, P2, P3, and P4. Pressure is represented by a vertical axis of each plot while the crankshaft position (e.g., crank angle) is represented by a shared horizontal axis. Plot P1 shows the pressure at the first outer cylinder throughout 720 degrees of rotation of the crankshaft (e.g., one complete firing cycle of the engine). Plot P2 shows the pressure at the inner cylinder throughout 720 degrees of rotation of the crankshaft. Plot P3 shows the pressure at the second outer cylinder throughout 720 degrees of rotation of the crankshaft. Plot P4 shows the pressure at both the first external junction of the IEM as well as the turbine inlet.

Looking first to column 700, the pressure plots P1, P2, P3, and P4 and their respective curves are associated with the processes occurring within the example of the 1-port IEM. The pressure at the first outer cylinder as a function of crank angle is represented by curve 704. The pressure at the inner cylinder as a function of crank angle is represented by curve 708. The pressure at the second outer cylinder as a function of crank angle is represented by curve 710. Lastly, the pressure as a function of crank angle at the first external junction of the 1-port IEM is represented by curve 716 while the pressure as a function of crank angle at the turbine is represented by curve 718.

In the 1-Port IEM example, the runners from the three cylinders are joined within the cylinder head and so pulse interactions between the cylinders can result in pressure losses. As demonstrated by pressure curve 704, the pressure at the first outer cylinder experiences a reduction 706 due to the partial reflection of pressure pulses originating from each of the outer cylinders. Similar losses can be seen along the pressure curve 710 of the second outer cylinder at areas of pressure reduction 712 and 714.

P4 of column 700 demonstrates the combined effects of the individual reductions (e.g., reductions 706, 712, and 714) produced by pulse interactions. Pressure curve 716 shows the pressure as a function of crank angle at the first external exhaust junction. The pressure curve 716 is a result of the combined pressures 704, 708, and 710. Similarly, pressure curve 718 shows the pressure as a function of crank angle at the turbine inlet. The pressure curve 718 is also a result of the combined pressures 704, 708, 710. A reduction in peak height (e.g., loss of exhaust pressure) can be seen at points 720 and 722 in relation to the peak height of point 721. This can be attributed to the pulse interactions previously mentioned. These losses (and by inclusion, these pulse interactions) are an undesirable outcome of the 1-port IEM configuration. The reduced exhaust pressures of points 720 and 722 adversely effects the amount of energy transferred to the turbine of the turbocharger and indicates a reduction in the velocity of the exhaust gases exiting the cylinders.

An examination of column 702 now shows a second set of pressure plots P1, P2, P3, and P4. Column 702, its plots, and its pressure curves are associated with the processes occurring within the example of the 2-port IEM. In this model, the configuration of the 2-port IEM is the same as that shown in FIG. 1-5 (e.g., the first runner of the center cylinder couples with the first manifold exhaust port while the second runner of the center cylinder couples with the second manifold exhaust port).

The pressure at the first outer cylinder as a function of crank angle is represented by curve 724. The pressure at the inner cylinder as a function of crank angle is represented by curve 728. The pressure at the second outer cylinder as a function of crank angle is represented by curve 730. Lastly, the pressure as a function of crank angle at the first external junction of the 2-port IEM is represented by curve 734 while the pressure as a function of crank angle at the turbine is represented by curve 736.

In the example of the 2-port IEM (in contrast to the example of the 1-port IEM) the runners from the outer cylinders are coupled to separate manifold exhaust ports. That is, the runners from the first outer cylinder couple to the first manifold exhaust port while the runners from the second outer cylinder couple to the second manifold exhaust port. Both manifold exhaust ports are coupled to the center cylinder by one runner each. In this 2-port example, the runners from the outer cylinders have no interaction with each other within the cylinder head (e.g., they are not in fluidic communication). As demonstrated by pressure curve 724, the pressure at the first outer cylinder experiences minimal reduction 726 due to the isolation of the runners of the first outer cylinder from the second outer cylinder. This constitutes a significant reduction in pulse reflection relative to the example of pressure curve 704 and reduction 706 due to pulse reflection as discussed above. A similar example is shown by pressure curve 730 containing minimal reduction 732. This also demonstrates a significant reduction in pulse reflection relative to pressure curve 710 with pulse reflection 714.

P4 of column 702 demonstrates the increase in pressure acquired at the first external exhaust junction and the turbine inlet due to the isolation of the runners of the first and second outer cylinders. Pressure curve 734 shows the pressure as a function of crank angle at the first external exhaust junction. The pressure curve 734 is a result of the combined pressures 724, 728, and 730. Similarly, pressure curve 736 shows the pressure as a function of crank angle at the turbine inlet. The pressure curve 736 is also a result of the combined pressures 724, 728, and 730. An increase in peak height (e.g., gain in exhaust pressure) can be seen at points 738 and 740 in relation to the peak height of point 739. This can be attributed to the elimination of the pulse interactions between the first and second outer cylinders. These pressure increases are a result of the 2-port IEM configuration. The increased exhaust pressures of points 738 and 740 relative to the reduced pressures of points 720 and 722 results in an increased amount of energy transferred to the turbine of the turbocharger and indicates an increase in the velocity of the exhaust gases exiting the cylinders.

Due to the elimination of pulse interaction between the first and second outer cylinders within the cylinder head in the example of the 2-port IEM, the performance of the engine is increased. The operation of the turbocharger compressor is enhanced by increasing exhaust gas pressures at the turbocharger turbine, thereby allowing the compressor to supply boost air to the cylinders more effectively. The 2-port IEM example is more effective than the 1-port IEM at accomplishing this task (e.g., increasing the exhaust gas pressures at the turbine). Additionally, the velocity of the exhaust gases exiting the cylinders is amplified in the 2-port IEM example. This results in the more efficient operation of the emissions control device which in turn results in a reduction of the $NO_x$ concentration of exhaust gases expelled into the atmosphere. The performance of the cylinder head is also increased in the 2-port IEM example due to the additional passage for coolant between the two runners of the center cylinder. Coolant is able to circulate within the cylinder head with increased efficiency. The additional coolant passage increases the contact surface area between the cylinder head and the coolant. This results in an increase in heat transfer from the cylinder head to the coolant and a reduction in the temperature of the cylinder head. This reduction in temperature reduces stress on the cylinder head and increases its lifespan.

Figure 8:
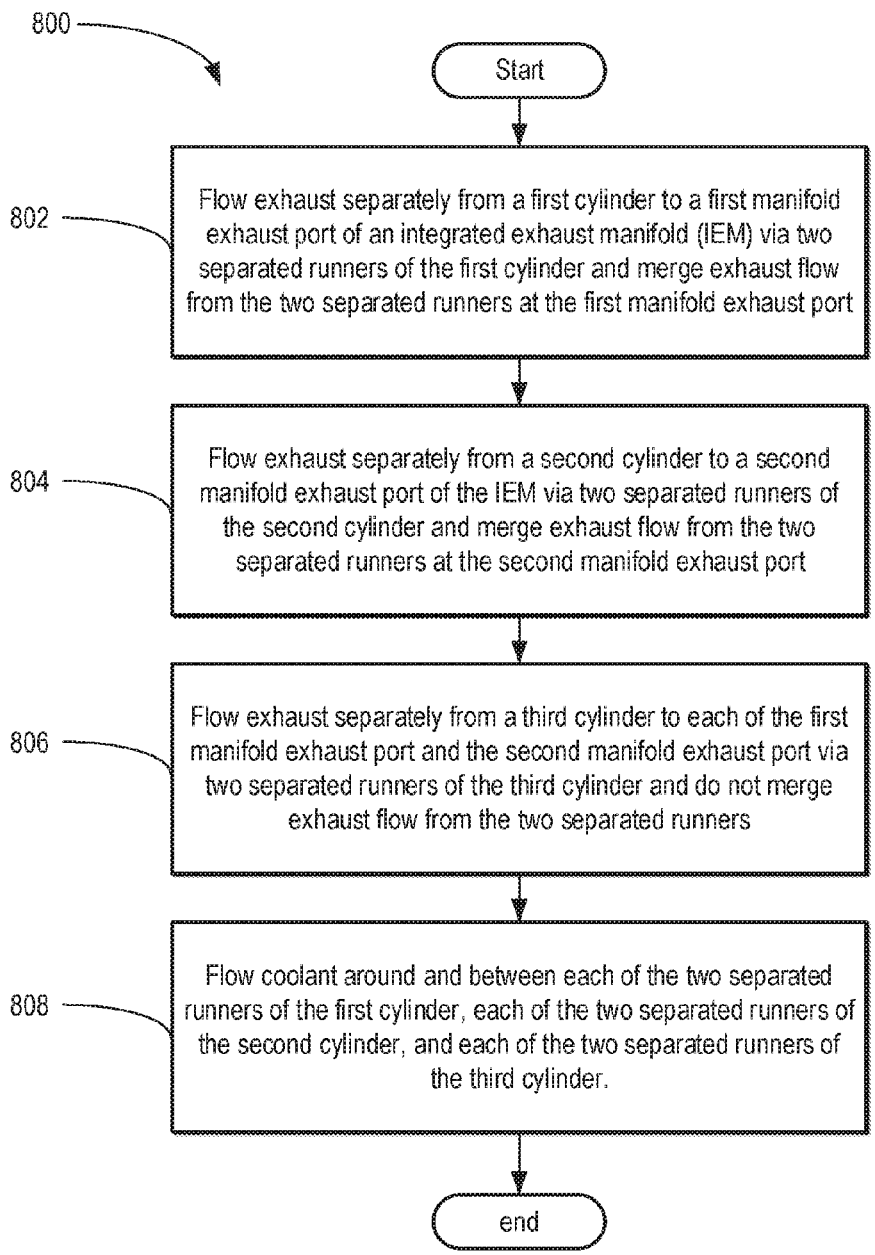
FIG. 8 shows a flowchart describing a method for routing exhaust gases through an engine system using a 2-port integrated exhaust manifold.

FIG. 8 depicts a flowchart 800 describing a method for routing exhaust gases from the cylinders and through the 2-port integrated exhaust manifold (IEM), such as 2-port IEM 115 shown in FIG. 1 or 2-port IEM 200 shown in FIGS. 2-5.

At 802, the method includes flowing exhaust separately from a first cylinder (e.g., cylinder 502 shown in FIG. 5) to a first manifold exhaust port of an integrated exhaust manifold (IEM) (e.g., manifold exhaust port 254 of IEM 200 shown in FIG. 5) via two separated exhaust runners (e.g., exhaust runners 238 and 240 as shown in FIG. 5) of the first cylinder and merging exhaust flow from the two separated exhaust runners at the first manifold exhaust port. In other words, the exhaust gases expelled from the first cylinder are routed to the first manifold exhaust port of the IEM by a pair of exhaust runners directly coupled to the first cylinder.

At 804, the method includes flowing exhaust separately from a second cylinder (e.g., cylinder 506 shown in FIG. 5) to a second manifold exhaust port (e.g., manifold exhaust port 526 shown in FIG. 5) of the IEM via two separated exhaust runners (e.g., exhaust runners 246 and 248 shown in FIG. 5) of the second cylinder and merging exhaust flow from the two separated exhaust runners at the second manifold exhaust port. In other words, the exhaust gases expelled from the second cylinder are routed to the second manifold exhaust port of the IEM by a pair of exhaust runners directly coupled to the second cylinder.

At 806, the method includes flowing exhaust separately from a third cylinder (e.g., cylinder 504 shown in FIG. 5) to each of the first manifold exhaust port and the second manifold exhaust port via two separated exhaust runners (e.g., exhaust runners 242 and 244 shown in FIG. 5) of the third cylinder and not merging exhaust flow from the two separated runners. In other words, the exhaust gases expelled from the third cylinder are routed to both the first and the second manifold exhaust ports of the IEM. The first runner of the third cylinder (e.g., exhaust runner 242 shown in FIG. 5) routes exhaust gases to the first manifold exhaust port of the IEM, and the second exhaust runner (e.g., exhaust runner 244) of the third cylinder routes exhaust gases to the second port of the IEM. The exhaust runners of the third cylinder flow to separate manifold exhaust ports and so the exhaust runners do not merge within the IEM of the cylinder head. In this way, no flow interaction occurs between the exhaust flows of the separated exhaust runners of the third cylinder within the IEM of the cylinder head.

At 808, the method includes flowing coolant around and between each of the two separated exhaust runners of the first cylinder, each of the two separated exhaust runners of the second cylinder, and each of the two separated exhaust runners of the third cylinder. For example, coolant may flow through passages (e.g., the passages within coolant jacket 201 of FIG. 2) within the IEM that are separated from the exhaust runners. The exhaust runners and the coolant passages are not in fluidic communication (e.g., they do not share gases and/or coolants).

In this way, the 2-port IEM configured for a three cylinder engine (or six cylinder V6, six cylinder I6, or twelve cylinder V12 engine) provides extra space for coolant circulation between the exhaust runners of an inner cylinder (as described above). Additionally, the 2-port IEM reduces exhaust gas pulse interactions between cylinders. Because the exhaust pulse interactions are reduced by the 2-port IEM, the 2-port IEM may be paired with a single scroll turbocharger rather than a dual scroll turbocharger in order to reduce costs and space required by the turbocharger.

In one embodiment, an integrated exhaust manifold includes first and second manifold exhaust ports; a first set of runners from a first cylinder; a second set of runners from a second cylinder; and a third set of runners from a third cylinder, where a first runner of the third set merges with the first set of runners at the first manifold exhaust port and a second runner of the third set merges with the second set of runners at the second manifold exhaust port. In a first example of the integrated exhaust manifold, the first exhaust port is in fluidic communication with a first inlet opening from a first runner of the first set of runners, a second inlet opening from a second runner of the first set of runners, and a third inlet opening from the first runner of the third set of runners. A second example of the integrated exhaust manifold optionally includes the first example and further includes wherein the first manifold exhaust port further includes a single outlet opening where all exhaust from the first cylinder and a portion of the exhaust from third cylinder leaves the first manifold exhaust port. A third example of the integrated exhaust manifold optionally includes one or more or both of the first and second examples, and optionally includes wherein the second manifold exhaust port includes a first inlet opening from a first runner of the second set of runners, a second inlet opening from a second runner of the second set of runners, and a third inlet opening from the second runner of the third set of runners. A fourth example of the integrated exhaust manifold optionally includes one or more or each of the first through third examples, and optionally includes wherein the second manifold exhaust port further includes a single outlet opening where all exhaust from the second cylinder and a portion of exhaust from the third cylinder leaves the second manifold exhaust port. A fifth example of the integrated exhaust manifold optionally includes one or more or each of the first through fourth examples, and optionally includes a cooling passage inlet, a cooling passage outlet, and a plurality of water passages fluidly coupled within the integrated exhaust manifold, between the cooling passage inlet and cooling passage outlet. A sixth example of the integrated exhaust manifold optionally includes one or more or each of the first through fifth examples, and optionally includes wherein the plurality of water passages includes a first water passage disposed between the first runner and second runner of the third set of runners. A seventh example of the integrated exhaust manifold optionally includes one or more or each of the first through sixth examples, and optionally includes wherein an outer wall of the first water passage is spaced apart from an outer wall of the first runner and outer wall of the second runner. An eighth example of the integrated exhaust manifold optionally includes one or more or each of the first through seventh examples, and optionally includes wherein the integrated exhaust manifold is part of a three-cylinder engine including the first cylinder, second cylinder, and third cylinder. A ninth example of the integrated exhaust manifold optionally includes one or more or each of the first through eighth examples, and optionally includes wherein the integrated exhaust manifold is included on one or both banks with three cylinder groupings in one of a six-cylinder V-engine or twelve-cylinder V-engine. A tenth example of the integrated exhaust manifold optionally includes one or more or each of the first through ninth examples, and optionally includes wherein the integrated exhaust manifold is a first integrated exhaust manifold for three cylinder groupings of one of an inline six-cylinder engine. An eleventh example of the integrated exhaust manifold optionally includes one or more or each of the first through tenth examples, and optionally includes wherein the first cylinder and second cylinder are outer cylinders and the third cylinder is positioned between the first cylinder and second cylinder.

In one embodiment, a device includes an integrated exhaust manifold (IEM) for a cylinder head including three cylinders, the IEM comprising: three sets of two separated runners, each set coupled to exhaust ports of one of the three cylinders; and two manifold exhaust ports, each coupled to one set of the three sets of runners and only one runner from another set of the three sets of runners. In a first example of the device, a first set of the three sets of two separated runners are coupled to exhaust ports of a first cylinder and split between the two manifold exhaust ports, where a first runner of the first set is coupled to a first manifold exhaust port of the two manifold exhaust ports and a second runner of the first set is coupled to a second manifold exhaust port of the two manifold exhaust ports. A second example of the device optionally includes the first example and further includes wherein the first cylinder is a middle cylinder positioned between a second cylinder and third cylinder of the three cylinders. A third example of the device optionally includes one or more or both of the first and second examples, and optionally includes wherein exhaust gases from the first runner do not mix with exhaust gases from the second runner within the IEM and further comprising a single exhaust junction, external to the IEM, where exhaust gases from the two manifold exhaust ports combine at the single exhaust junction. A fourth example of the device optionally includes one or more or each of the first through third examples, and optionally includes wherein the IEM further comprises a plurality of water passages cored into the IEM and positioned in spaces that separate each runner in each set of the three separated runners.

A method for a three-cylinder engine (with exactly three cylinders, no more and no less, for example in a straight line in a block) includes flowing exhaust separately from a first cylinder to a first manifold exhaust port of an integrated exhaust manifold (IEM) via two (for example exactly two, no more and no less) separated runners of the first cylinder and merging exhaust flow from the two separated runners at the first manifold exhaust port; flowing exhaust separately from a second cylinder to a second manifold exhaust port of the IEM via two separated runners (for example exactly two, no more and no less) of the second cylinder and merging exhaust flow from the two separated runners at the second manifold exhaust port; and flowing exhaust separately from a third cylinder to each of the first manifold exhaust port and the second manifold exhaust port via two separated runners of the third cylinder (for example exactly two, no more and no less) and not merging exhaust flow from the two separated runners, for example throughout an entirety of the cylinder head. In a first example of the method, the method includes flowing coolant around and between each of the two separated runners of the first cylinder, each of the two separated runners of the second cylinder, and each of the two separated runners of the third cylinder. A second example of the method optionally includes the first example and further includes firing the first cylinder, then the third cylinder, and then the second cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An integrated exhaust manifold, comprising:
    first and second manifold exhaust ports;
    a first set of runners from a first cylinder;
    a second set of runners from a second cylinder; and
    a third set of runners from a third cylinder, where a first runner of the third set merges with the first set of runners at the first manifold exhaust port and a second runner of the third set merges with the second set of runners at the second manifold exhaust port.

2. The integrated exhaust manifold of claim 1, wherein the first manifold exhaust port is in fluidic communication with a first inlet opening from a first runner of the first set of runners, a second inlet opening from a second runner of the first set of runners, and a third inlet opening from the first runner of the third set of runners.

3. The integrated exhaust manifold of claim 2, wherein the first manifold exhaust port further includes a single outlet opening where all exhaust from the first cylinder and a portion of the exhaust from third cylinder leaves the first manifold exhaust port.

4. The integrated exhaust manifold of claim 1, wherein the second manifold exhaust port includes a first inlet opening from a first runner of the second set of runners, a second inlet opening from a second runner of the second set of runners, and a third inlet opening from the second runner of the third set of runners.

5. The integrated exhaust manifold of claim 4, wherein the second manifold exhaust port further includes a single outlet opening where all exhaust from the second cylinder and a portion of exhaust from the third cylinder leaves the second manifold exhaust port.

6. The integrated exhaust manifold of claim 1, further comprising a cooling passage inlet, a cooling passage outlet, and a plurality of water passages fluidly coupled within the integrated exhaust manifold, between the cooling passage inlet and cooling passage outlet.

7. The integrated exhaust manifold of claim 6, wherein the plurality of water passages includes a first water passage disposed between the first runner and second runner of the third set of runners.

8. The integrated exhaust manifold of claim 7, wherein an outer wall of the first water passage is spaced apart from an outer wall of the first runner and an outer wall of the second runner of the third set of runners.

9. The integrated exhaust manifold of claim 1, wherein the integrated exhaust manifold is part of a three-cylinder engine including the first cylinder, second cylinder, and third cylinder.

10. The integrated exhaust manifold of claim 1, wherein the integrated exhaust manifold is included on one or both banks with three cylinder groupings in one of a six-cylinder V-engine or twelve-cylinder V-engine.

11. The integrated exhaust manifold of claim 1, wherein the integrated exhaust manifold is a first integrated exhaust manifold for three cylinder groupings of one of an inline six-cylinder engine.

12. The integrated exhaust manifold of claim 1, wherein the first cylinder and second cylinder are outer cylinders and the third cylinder is positioned between the first cylinder and second cylinder.

13. A device, comprising:
an integrated exhaust manifold (IEM) for a cylinder head including three cylinders, the IEM comprising:
three sets of two separated runners, each set coupled to exhaust ports of one of the three cylinders; and
two manifold exhaust ports, each coupled to one set of the three sets of two separated runners and only one runner from another set of the three sets of two separated runners.

14. The device of claim 13, wherein a first set of the three sets of two separated runners is coupled to exhaust ports of a first cylinder and split between the two manifold exhaust ports, where a first runner of the first set is coupled to a first manifold exhaust port of the two manifold exhaust ports and a second runner of the first set is coupled to a second manifold exhaust port of the two manifold exhaust ports.

15. The device of claim 14, wherein the first cylinder is a middle cylinder positioned between a second cylinder and third cylinder of the three cylinders.

16. The device of claim 14, wherein exhaust gases from the first runner of the first set do not mix with exhaust gases from the second runner of the first set within the IEM and further comprising a single exhaust junction, external to the IEM, where exhaust gases from the two manifold exhaust ports combine at the single exhaust junction.

17. The device of claim 13, wherein the IEM further comprises a plurality of water passages cored into the IEM and positioned in spaces that separate each runner in each set of the three sets of two separated runners.

18. A method for a three-cylinder engine, comprising:
flowing exhaust separately from a first cylinder to a first manifold exhaust port of an integrated exhaust manifold (IEM) via two separated runners of the first cylinder and merging exhaust flow from the two separated runners of the first cylinder at the first manifold exhaust port;
flowing exhaust separately from a second cylinder to a second manifold exhaust port of the IEM via two separated runners of the second cylinder and merging exhaust flow from the two separated runners of the second cylinder at the second manifold exhaust port; and
flowing exhaust separately from a third cylinder to each of the first manifold exhaust port and the second manifold exhaust port via two separated runners of the third cylinder and not merging exhaust flow from the two separated runners of the third cylinder.

19. The method of claim 18, further comprising flowing coolant around and between each of the two separated runners of the first cylinder, each of the two separated runners of the second cylinder, and each of the two separated runners of the third cylinder.

20. The method of claim 18, further comprising firing the first cylinder, then the third cylinder, and then the second cylinder.

* * * * *